Patented Aug. 22, 1933

1,923,202

UNITED STATES PATENT OFFICE 1,923,202

WATER-INSOLUBLE AZO-DYESTUFFS AND FIBER DYED THEREWITH

Franz Henle and Herbert Kracker, Frankfort-on-the-Main-Hochst, Germany, assignors to General Aniline Works, Inc., New York, N. Y., a Corporation of Delaware No Drawing. Application April 24, 1931, Serial No. 532,690, and in Germany May 9, 1930

10 Claims. (Cl. 260—86)

The present invention relates to new water-insoluble azo-dyestuffs and to fiber dyed therewith.

We have found that new valuable water-insoluble azo-dyestuffs are obtainable by combining with a diazotized amine of the benzene, naphthalene- or anthracene-series an aroyl-acetic acid arylide of the following general formula $$R-CO-CH_2-CO-NH-R'$$

wherein R and R' stand for radicals of the benzene-, naphthalene- or diphenyl-series the arylide and amine, however, being free from groups which would make the dyestuffs soluble in water, such as the sulfonic acid or carboxylic acid group.

The dyestuffs, thus obtained, yield yellow to red tints and for the greater part have a very good fastness to light.

The aroyl-acetic acid mono arylides of the general formula $$R-CO-CH_2-CO-NH-R'$$

may be obtained, for instance, by condensing an aroyl-acetic acid ester of the formula $$R-CO-CH_2-COOC_2H_5$$

with a primary aromatic amine of the formula $NH_2-R'$.

Furthermore, we have found that the said arylides have such an affinity for cotton fiber that, according to the process hereafter described, dyeings are obtained which, as regards intensity and beauty of shade, surpass the dyeings obtained with the corresponding aceto-acetic-acid-mono-arylides.

The said arylides, therefore, are useful for developing the dyestuff on the cotton fiber. A large number of the dyeings obtained by developing the said arylides with any diazotized base have a very good fastness to light. Besides, the dyestuffs have a very good fastness to water, chlorine and boiling with soap and sodium carbonate. They are, therefore, of great value for industrial dyeing purposes.

The dyestuffs can be produced on the fiber in the usual manner by dyeing or printing or they can be made in substance or on any of the usual substrata adapted for the production of lakes.

The dyestuffs obtained by this invention are characterized by the following probable general formula

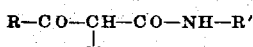

wherein R and R' stand for radicals of the benzene-, naphthalene- or diphenyl-series, R" stands for a radical of the benzene-, naphthalene- or anthracene-series, the radicals, however, being free from groups which would make the dyestuffs soluble in water.

The following examples serve to illustrate the invention, but they are not intended to limit it thereto:

Dyeing prescription for Examples 1 and 2

Well boiled cotton fabric is dried and impregnated on the foulard with the grounding liquor, squeezed and dried. The dry goods are passed through the diazo-solution, exposed to the air for about 3 minutes and passed through a bath containing about 3 cc of hydrochloric acid of 22° Bé. per liter. The material is then well rinsed, soaped in a boiling bath containing soap and sodium carbonate, rinsed again and dried.

Example 1

(a) *Grounding liquor*

16.2 grams of benzoylacetic acid-ortho-chloranilide are made into a paste with 30 cc of Turkey red oil of 50% strength and 21 cc of caustic soda solution of 34° Bé. This paste is dissolved by pouring 1 liter of boiling water over it.

(b) *Diazo-solution*

11.4 grams of 1-amino-2-methyl-4-nitrobenzene are diazotized in known manner with 21 cc of hydrochloric acid of 220 Bé. and 5.6 grams of sodium nitrite dissolved in water. The clear diazo-solution is rendered neutral to Congo paper by means of about 15 grams of crystallized sodium acetate and the whole is made up to 1 liter.

There is obtained a vivid, medium yellow of very good fastness to light.

The dyestuff has the following probable formula

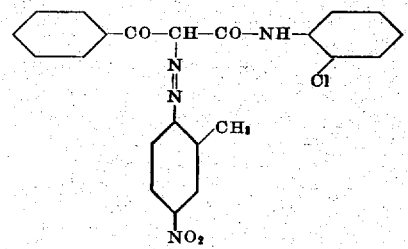

Example 2

(a) *Grounding liquor*

The grounding liquor is prepared as in Example 1 by using, however, 15 grams of benzolyacetic acid-ortho-toluidide.

(b) *Diazo-solution*

The dye-bath, likewise, is prepared as in Example 1 but from 12.6 grams of 1-amino-2-methoxy-4-nitrobenzene.

There is obtained a reddish-yellow of very good fastness to light.

The dyestuff has the following probably formula

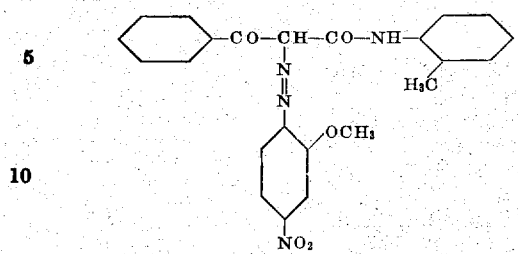

EXAMPLE 3

23.9 grams of benzoylacetic acid anilide are dissolved in 50 cc of hot 2N-caustic soda solution and water and, after cooling, precipitated in a finely dispersed state by means of 50 cc of 2N-acetic acid. Into this suspension there is run a diazo-solution prepared as follows: 17.3 grams of 1-amino-4-chloro-2-nitrobenzene are diazotized in the usual manner with 27 cc of hydrochloric acid of 22° Bé. and 7.2 grams of sodium nitrite. The clear diazo-solution is rendered neutral to Congo paper by means of sodium acetate.

After stirring for some hours, the formation of the dyestuff which has the following probable formula

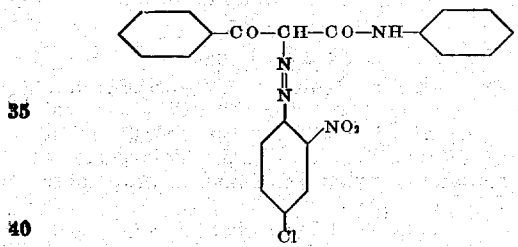

is finished. It is filtered by suction and forms a yellow paste of very good fastness to light.

EXAMPLE 4

15.2 grams of 1-amino-2-methyl-4-nitrobenzene are diazotized in the usual manner by means of 30 cc. of hydrochloric acid of 20° Bé and 7.2 grams of sodium nitrite dissolved in water. The clear diazo-solution is rendered neutral to Congo paper by means of sodium acetate. Into this solution, there is run an arylide solution prepared by dissolving 27.4 grams of para-chlorobenzoylacetic-acid anilide in 50 cc of 2N-caustic soda solution and hot water.

The dyestuff which is formed precipitates and may be separated by filtering by suction. It has the following probable formula

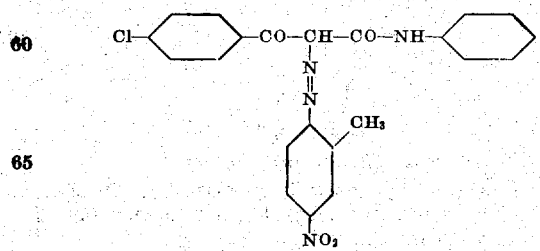

and forms a yellow paste of very good fastness to light.

EXAMPLE 5

(a) *Grounding liquor*

A paste is prepared from 20 grams of α-naphthoyl-acetic acid anilide with 5 cc of sodium Turkey red oil of 50% strength and 21 cc of caustic soda solution of 34° Bé. This paste is dissolved by pouring on to it 1 liter of boiling water.

(b) *Diazo printing color*

12.6 grams of 1-amino-4-nitro-2-methoxybenzene are diazotized by means of 21 cc of hydrochloric acid of 22° Bé. and 5.6 grams of sodium nitrite dissolved in water, with addition of ice. The whole is made up to 500 cc, thickened with 480 grams of tragacanth (60:1000), and rendered neutral to Congo paper by addition of 20 grams of crystallized sodium acetate.

(c) *Printing prescription*

The cotton is padded with the grounding liquor, dried and then printed with the diazo printing color. It is then washed and soaped while boiling.

A reddish yellow of very good fastness to light is thus obtained.

The dyestuff has the following probable formula

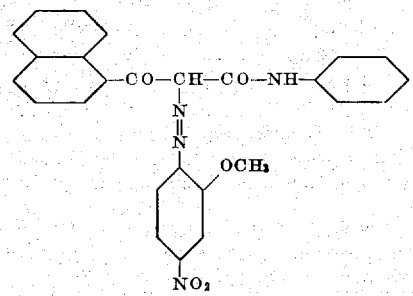

By using as coupling components any other aroyl-acetic acid-mono-arylides and as diazotizing components any other amine, dyestuffs are obtainable which, likewise, are partly distinguished by a very good fastness to light.

The following table indicates a number of dyestuffs obtainable according to the present process but does not comprise all possibilities for the preparation of dyestuffs of very good fastness to light by using other coupling components and other amines, which components, however, must be free from groups which would render the dyestuffs soluble in water; it, therefore, is not intended to limit the invention to the dyestuffs mentioned therein:

| Diazotizing component | Coupling component | Tint |
|---|---|---|
| (1) 1-amino-4-methyl-2-nitro-benzene | Benzoylacetic-acid anilide | Greenish yellow |
| (2) 1-amino-4-methyl-2-nitro-benzene | Benzoylacetic-acid-ortho-chloranilide | Reddish yellow |
| (3) 1-amino-2.5-dichloro-benzene | Benzoylacetic-acid-ortho-chloranilide | Medium yellow |
| (4) 1-amino-4-methyl-2-nitro-benzene | Benzoylacetic-acid-ortho-chloranilide | Greenish yellow |
| (5) 1-amino-4-chloro-2-nitro-benzene | Benzoylacetic-acid-ortho-chloranilide | Greenish yellow |
| (6) 1-amino-2-nitro-benzene | Benzoylacetic-acid-ortho-chloranilide | Medium yellow |
| (7) 1-amino-anthraquinone | Benzoylacetic-acid ortho-toluidide | Reddish yellow |
| (8) 1-amino-2-methyl-4-nitrobenzene | Benzoylacetic acid anilide | Greenish yellow |
| (9) 1-amino-2-methoxy-4-nitrobenzene | Benzoylacetic acid anilide | Greenish yellow |
| (10) 1-amino-2-nitro-4-methoxybenzene | Benzoylacetic acid anilide | Reddish yellow |
| (11) 1-amino-4-nitro-2-methylbenzene | Benzoyl-acetic-acid 4-chloro-2-methyl-1-anilide | Greenish yellow |
| (12) ortho-nitraniline | Benzoyl-acetic-acid-4-chloro-2-methoxy-1-anilide | Reddish yellow |
| (13) 1-amino-2-nitro-4-methylbenzene | Para-methylbenzoyl-acetic-acid-4-methoxy-1-anilide | Reddish yellow |
| (14) 2.5-dichloro-aniline | Para-methylbenzoyl-acetic-acid-α-naphthylamide | Greenish yellow |
| (15) 1-amino-2-nitro-4-methoxybenzene | Para-methoxybenzoyl-acetic-acid anilide | Reddish yellow |

| Diazotizing component | Coupling component | Tint |
|---|---|---|
| (16) 1-amino-2-nitro-4-chlorobenzene | β-naphthoyl-acetic-acid-anilide | Medium yellow |
| (17) 1-amino-4-nitro-2-methoxybenzene | Benzoyl-acetic acid para-phenylanilide | Reddish yellow |
| (18) 1-amino-2-methyl-4-nitrobenzene | Benzoyl-acetic-acid-ortho-phenylanilide | Reddish yellow |
| (19) 1-amino-2-methoxy-4-nitrobenzene | Para-phenylbenzoyl-acetic-acid anilide | Reddish yellow |
| (20) 1-amino-4-methoxy-3-nitrobenzene | Para-phenylbenzoyl-acetic acid-anilide | Reddish yellow |

We claim:

1. The water-insoluble azo-dyestuffs of the following probable general formula

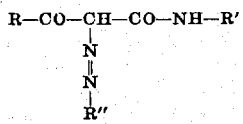

wherein R and R' stand for radicals of the benzene-, naphthalene- or diphenyl-series, R" stands for a radical of the benzene-, naphthalene- or anthracene-series, the radicals being free from sulfonic- or carboxylic acid groups, dyeing yellow to red shades and being distinguished by their good fastness properties, particularly by their good fastness to light.

2. The water-insoluble azo-dyestuffs of the following probable general formula

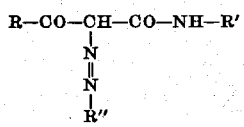

wherein R and R' stand for radicals of the benzene series and R" stands for a radical of the benzene-, naphthalene- or anthracene-series, the radicals being free from sulfonic- or carboxylic acid groups, dyeing yellow to red shades and being distinguished by their good fastness properties, particularly by their good fastness to light.

3. The water-insoluble azo-dyestuff of the following probable formula

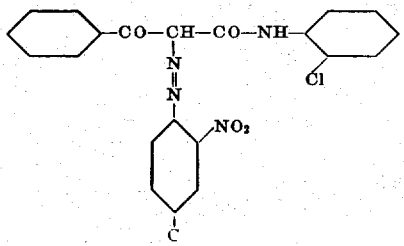

dyeing a greenish yellow shade and being distinguished by its good fastness properties, particularly by its good fastness to light.

4. The water-insoluble azo-dyestuff of the following probable formula

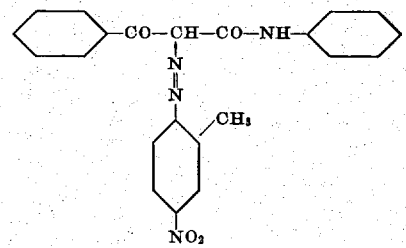

dyeing a greenish yellow shade and being distinguished by its good fastness properties, particularly by its good fastness to light.

5. The water-insoluble azo-dyestuff of the following probable formula

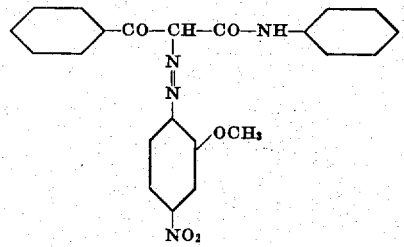

dyeing a greenish yellow shade and being distinguished by its good fastness properties, particularly by its good fastness to light.

6. Fiber dyed with the dyestuffs as claimed in claim 1.

7. Fiber dyed with the dyestuffs as claimed in claim 2.

8. Fiber dyed with the dyestuff as claimed in claim 3.

9. Fiber dyed with the dyestuff as claimed in claim 4.

10. Fiber dyed with the dyestuff as claimed in claim 5.

FRANZ HENLE.
HERBERT KRACKER.